United States Patent Office

3,281,217
Patented Oct. 25, 1966

3,281,217
METHOD OF MAKING A PERHALOGENATED COMPOUND
William Charles Firth, Jr., Stamford, Conn., assignor to American Cyanamid Company, Stamford, Conn., a corporation of Maine
No Drawing. Filed June 28, 1962, Ser. No. 207,154
8 Claims. (Cl. 23—356)

This invention relates broadly to a new and useful method of making a perhalogenated compound and, more partcularly, a perhalogenated amine. The invention is especially concerned with an improved method of making a "mixed" perhalogenated amine, that is, one wherein the halogens atached to the amine nitrogen atom are different; and, still more particularly, one wherein at least two of the halogen atoms are fluorine while the third is a different halogen atom, specifically chlorine. In the latter case the mixed perhalogenated amine is chlorodifluoroamine, $NF_2Cl$.

Chlorodifluoroamine, which is a colorless, air-stable gas, is a known compound. It was described by Petry [J.A.C.S., 82, 2400 (1960)], who prepared it by interaction of equimolar quantities of difluoroamine and boron trichloride. These two gaseuos reactants were condensed in vacuo at $-130°$ C. to yield a white solid which was stable at $-80°$ C. Warming this solid toward room temperature resulted in decomposition to HCl, Cl, a non-volatile solid and chlorodifluoroamine. Purification was accomplished by vacuum fractionation through traps maintained at $-142°$ C. and $-196°$ C. The $-196°$ C. fraction was passed through a tower containing NaOH on asbestos to remove hydrogen chloride. It was then refractioned to obtain purified chlorodifluoroamine, which is useful in explosive applications and, also, as an intermediate in chemical synthesis. For example, $NF_2Cl$ reacts with mercury to form $N_2F_4$ and $Hg_2Cl_2$.

The present invention is based on my discovery that chlorodifluoroamine can be prepared by bringing chlorine and difluoroamine into reactive relationship in the presence of an alkali-metal fluoride; and isolating chlorodifluoroamine from the reaction products. For example, chlorofluoroamine can be readily and economically obtained in a good yield by condensing gaseous chlorine ($Cl_2$) and gaseous difluoroamine, $NF_2H$, into a suitable receptacle containing an alkali-metal fluoride, specifically rubidium fluoride. The receptacle is then allowed to warm the ambient temperature, e.g., $15°-35°$ C., more particularly $20°-30°$ C., whereby the difluoroamine is converted to chlorodifluoroamine in yields of over 60%.

Taking rubidium fluoride as illustrative of the alkali-metal fluoride employed, the reaction may be illustrated by the following equation:

(I)  
$Cl_2 + NF_2H + RbF \rightarrow NF_2Cl + RbF \cdot HCl$

It was surprising and unobvious that the reaction would proceed as shown by the foregoing equation, since normally it would be expected that the reaction would yield dichlorofluoroamine in accordance with the following equation:

(II)  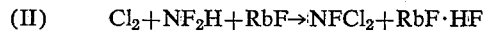
$Cl_2 + NF_2H + RbF \rightarrow NFCl_2 + RbF \cdot HF$

The process of this invention has economical advantages, for commercial operations, in that the alkali-metal fluoride can be regenerated and re-used in the process, for example merely by heating the HCl salt thereof, i.e., $MF \cdot HCl$, where M represents rubidium, cesium, potassium or other alkali metal. This can be represented by the following equation:

(III)  $MF \cdot HCl \xrightarrow{\Delta} MF + HCl$

In order that those skilled in the art may better understand how the present invention can be carried into effect, the following examples are given by way of illustration and not by way of limitation. All parts and percentages are by weight unless otherwise indicated.

*Example 1*

Into an evacuated 220 ml. Pyrex bulb which contained 5 g. of anhydrous ribidium fluoride was condensed at $-196°$ C. 3.9 mmoles of chlorine and one millimole of difluoroamine. The reactor was isolated from the rest of the vacuum system, allowed to warm to room temperature ($20°-30°$ C.) over 10 to 15 minutes and then allowed to stand at room temperature for two hours. Infrared analysis of the product gas showed that all of the difluoroamine had reacted and that chlorodifluoroamine was a major product.

The gaseous product from the above-described reaction was divided in the vacuum line into a $-132°$ C. condensate, a $-160°$ C. condensate and a $-196°$ C. condensate. The latter two fractions were combined, cooled to $-196°$ C. and then allowed to warm to room temperature (about $20°-30°$ C.). As the vapors formed, they were passed in the vacuum line through a drying unit comprising sodium hydroxide on asbestos at $0°$ C., a $-132°$ C. trap and a $-196°$ C. trap.

The yield of $-196°$ C. condensate amounted to 0.62 mmole of chlorodifluoroamine, and corresponded to 63% of the theoretical yield. Trace amounts of nitrosyl chloride and silicon tetrafluoride, as well as a small amount of trans-difluorodiazine, were present as impurities.

The amount of rubidium fluoride used in Example 1 was theoretically sufficient to convert substantially all of the difluoroamine to difluorodiazine in two hours under the conditions of the said example. However, more or less rubidium or other alkali-metal fluoride may be necessary depending upon the available surface area of the particular salt employed.

Since difluoroamine is known to react with some alkali-metal fluorides, including rubidium fluoride, to form difluorodiazine and it is also known that the different alkali-metal fluorides react at different rates with difluoroamine, the amount of chlorine used may depend both upon the particular alkali-metal cation and the available surface area of the particular salt used.

*Example 2*

An equimolar mixture of chlorine and difluoroamine was prepared by condensing the gases into a Pyrex bulb from which light was excluded by several layers of aluminum foil and allowing the gases to warm to ambient temperature and equilibrate. Then 1.3 mmoles of the gaseous mixture was admitted to an evacuated 165 ml. Pyrex reactor which contained 5.0 grams of finely ground anhydrous potassium fluoride (>99% KF). Light was excluded from the reactor by several layers of aluminum foil. After 18 hours at room temperature ($20°-30°$ C.) the gaseous product amounted to 0.7 mmole and was mostly chlorodifluoroamine according to infrared analysis. Purification of the gas by the method of Cady and Siegworth [Anal. Chem., 31, 618 (1959)] gave 0.4 mmole (66% yield) of pure chlorodifluoroamine.

The mixture of chlorine and difluoroamine which was not contacted with the potassium fluoride was largely unchanged after 18 hours at ambient temperature.

As will be understood by those skilled in the art, the reactants used in practicing the present invention advantageously are used in dry or anhydrous (substantially completely anhydrous) state, and the reaction is advantageously effected under anhydrous conditions.

The molar ratio of chlorine ($Cl_2$) to difluoroamine ($HNF_2$) should be at least 1:1, or any excess of chlorine over equimolar proportions. The minimum amount of alkali-metal fluoride should be at least the stoichiometrical amount required to absorb all of the HCl by-product of the reaction. The maximum amount of alkali-metal fluoride employed does not appear to be critical.

I claim:

1. The method of preparing chlorodifluoroamine which comprises bringing chlorine and difluoroamine into reactive relationship in the presence of an alkali-metal fluoride in an amount at least sufficient to absorb all of the hydrogen chloride by-product; and isolating chlorodifluoroamine from the reaction products.

2. A method as in claim 1 wherein the alkali-metal fluoride is rubidium fluoride.

3. A method as in claim 1 wherein the alkali-metal fluoride is potassium fluoride.

4. The method of preparing chlorodifluoroamine which comprises condensing gaseous chlorine and gaseous difluoroamine in a vessel containing an alkali-metal fluoride in an amount at least sufficient to absorb all of the hydrogen chloride by-product; allowing the liquid condensate comprising the reaction products to warm to ambient temperature thereby vaporizing the said liquid condensate; and isolating chlorodifluoroamine from the vapors of the said liquid condensate.

5. The method of preparing chlorodifluoroamine which comprises condensing gaseous chlorine and gaseous difluoroamine in a vessel containing an alkali-metal fluoride in an amount at least sufficient to absorb all of the hydrogen chloride by-product; allowing the liquid condensate comprising the reaction products to warm to ambient temperature thereby vaporizing the said liquid condensate; drying the vapors of the said liquid condensate; and isolating chlorodifluoroamine from the dried vapors of the said condensate.

6. A method as in claim 5 wherein the alkali-metal fluoride is rubidium fluoride.

7. The method of preparing chlorodifluoroamine which comprises forming a mixture of gaseous chlorine and gaseous difluoroamine; contacting alkali-metal fluoride in an amount at least sufficient to absorb all of the hydrogen chloride by-product with the said gaseous mixture and allowing the reaction between the said gaseous mixture and alkali-metal fluoride to proceed at ambient temperature; and isolating chlorodifluoroamine from the resulting gaseous reaction mass.

8. A method as in claim 7 wherein the alkali-metal fluoride is potassium fluoride.

References Cited by the Examiner

UNITED STATES PATENTS 3,077,377  2/1963  Lawton et al. _____ 23—14

OTHER REFERENCES

Petry: Journal Am. Chem. Soc., 82 p. 2400 (1960).

OSCAR R. VERTIZ, *Primary Examiner.*

CARL D. QUARFORTH, J. D. VOIGHT,

*Assistant Examiners.*